（12） United States Patent
Feng

(10) Patent No.: US 7,682,178 B2
(45) Date of Patent: Mar. 23, 2010

(54) SURFACE CONTACT CARD HOLDER

(75) Inventor: Hai-Shen Feng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/201,099

(22) Filed: Aug. 29, 2008

(65) Prior Publication Data
US 2009/0280670 A1    Nov. 12, 2009

(30) Foreign Application Priority Data
May 9, 2008    (CN) .................... 2008 1 0301515

(51) Int. Cl.
*H01R 13/62* (2006.01)
(52) U.S. Cl. .................... 439/326; 439/630; 439/946
(58) Field of Classification Search ................. 439/326, 439/330, 331, 629, 630, 946
See application file for complete search history.

(56) References Cited

U.S. PATENT DOCUMENTS

| | | | | |
|---|---|---|---|---|
| 5,591,932 A * | 1/1997 | Staiert et al. | ............... | 89/33.03 |
| 6,231,365 B1 * | 5/2001 | Konno et al. | ................ | 439/331 |
| 6,273,739 B1 * | 8/2001 | Konno et al. | ................ | 439/331 |
| 6,334,786 B1 * | 1/2002 | Lee | ............................ | 439/331 |
| 6,888,724 B2 * | 5/2005 | Shaie | ......................... | 361/719 |
| 6,971,919 B1 * | 12/2005 | Huang | ......................... | 439/630 |
| 7,161,811 B2 * | 1/2007 | Richter | ....................... | 361/737 |
| 2004/0190265 A1 * | 9/2004 | Shaie | ......................... | 361/719 |
| 2005/0159037 A1 * | 7/2005 | Su et al. | ..................... | 439/326 |
| 2009/0241303 A1 * | 10/2009 | Zhu | ......................... | 24/591.1 |

\* cited by examiner

*Primary Examiner*—James Harvey
(74) *Attorney, Agent, or Firm*—Steven M. Reiss

(57) ABSTRACT

A surface contact card holder (100) includes a receiving seat (10), a cover (20) and a pivot shaft (30). The receiving seat is configured for carrying a surface contact card (300) therein. The cover covers the receiving seat and releasably latches the receiving seat. The pivot shaft rotatably connects the cover to the receiving seat for allowing insertion and removal of the surface contact card.

13 Claims, 4 Drawing Sheets

SURFACE CONTACT CARD HOLDER

BACKGROUND

1. Field of the Invention

The present invention generally relates to structures for holding cards in an electronic device and, particularly, to surface contact card holders for holding a surface contact card in a portable electronic device.

2. Description of Related Art

With the development of wireless communication and information processing technologies, portable electronic devices such as mobile phones are now in widespread use. These electronic devices enable consumers to enjoy high-tech services anytime and anywhere. Surface contact cards having special circuits are widely used in portable electronic devices to enhance or specialize the functions of the portable electronic devices. For example, a subscriber identity module (SIM) card can be placed in a mobile phone to dedicate the mobile phone' functions to the SIM card owner. By changing SIM cards, a single mobile phone can be used by many different SIM card owners as a personal phone.

During the insertion and/or removal of SIM cards from personal electronic devices, friction is produced between the SIM card and a connector under the SIM card. Thus, after repeated use, the contact terminals of the SIM card and the connector are likely to wear. This wear may result, e.g., in an ineffective electrical connection between the chip card and the connector.

Therefore, there is room for improvement within the art.

BRIEF DESCRIPTION OF THE DRAWINGS

Many aspects of the surface contact card holder can be better understood with reference to the following drawings. The components in the drawings are not necessarily drawn to scale, the emphasis instead being placed upon clearly illustrating the principles of the present surface contact card holder. Moreover, in the drawings, like reference numerals designate corresponding parts throughout the several views.

DETAILED DESCRIPTION OF THE EMBODIMENTS

The present surface contact card holder is suitable for portable electronic devices, such as mobile phones, PDAs, and so on. The surface contact card holder can be used for holding surface contact cards such as SIM cards, compact flash cards (CFs), multimedia cards (MMCs), and so on.

Figure 1:
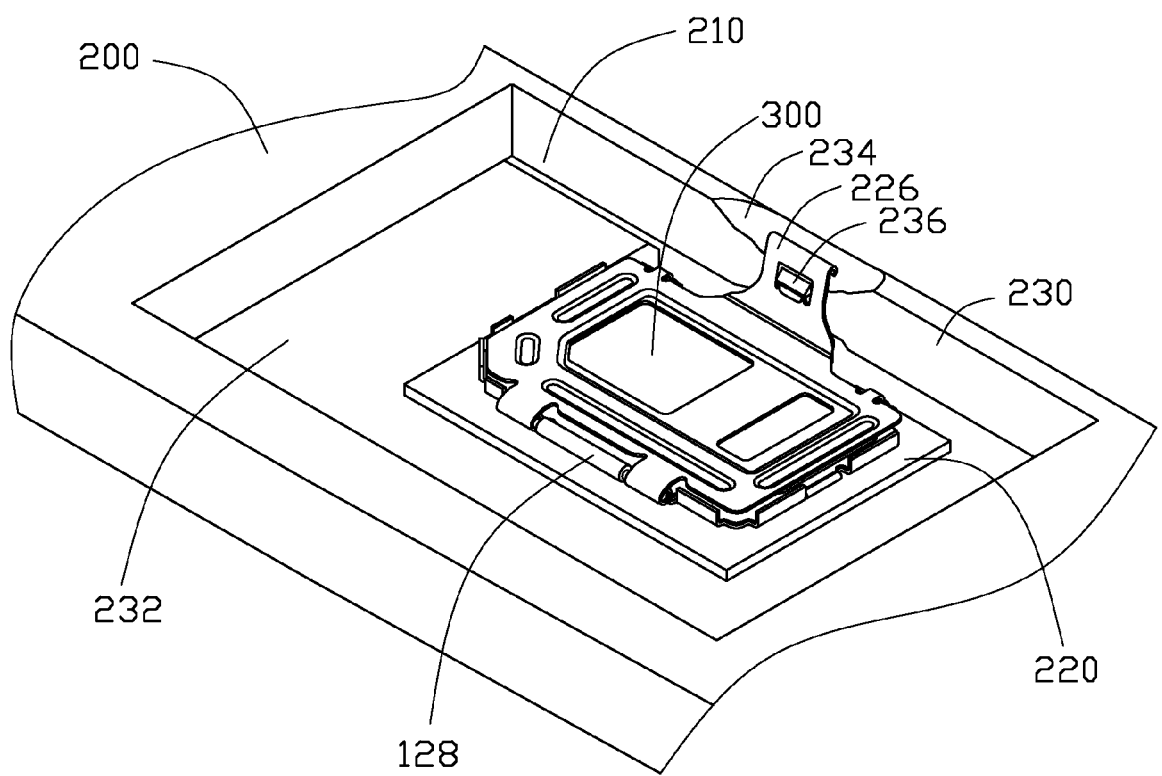
FIG. 1 is an assembled view of a surface contact card holder incorporated into a portable electronic device.
Figure 2:
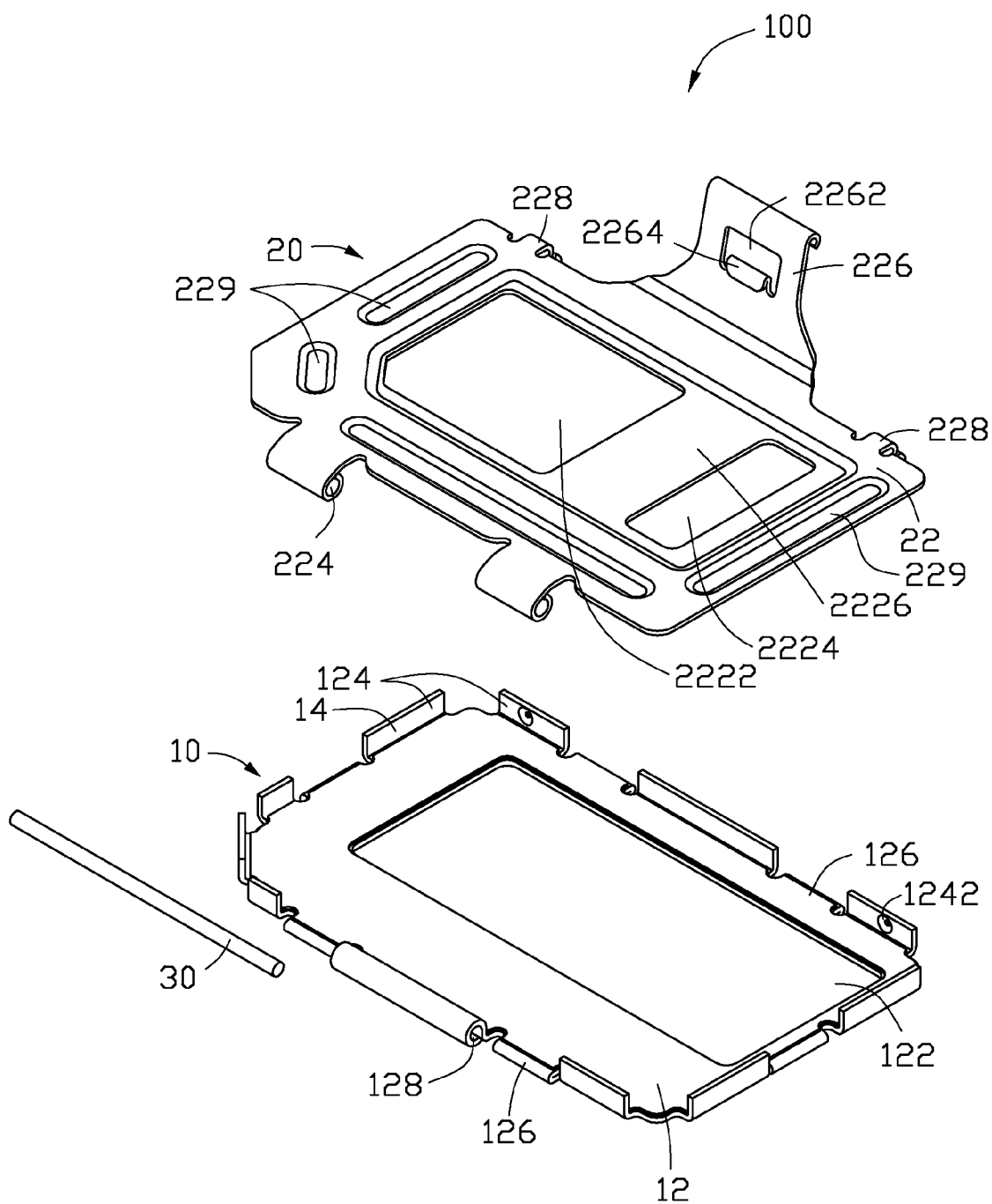
FIG. 2 is an exploded, isometric view of the surface contact card holder in accordance with an exemplary embodiment.

FIG. 1 shows a surface contact card holder 100 for a SIM card 300 incorporated in a mobile phone/portable electronic device. The mobile phone and the SIM card 300 are exemplary applications for the purposes of describing details of the surface contact holder 100 of the exemplary embodiment. The mobile phone has a main body 200. The main body 200 defines a rectangular cavity 210 surrounded by four sidewalls 230 and having a bottom surface 232. An electronic board 220 is positioned on the bottom surface 232. The electronic board 220 forms a plurality of electrical contacts (not shown). A portion of one of the sidewalls 230 defines an arcuate surface 234. A rectangular protrusion 236 extends from the arcuate surface 234 and is tilted relative to the arcuate surface 234.

The surface contact card holder 100 is configured for being received in the cavity 210, and includes a receiving seat 10, a cover 20, and a pivot shaft 30 connecting the receiving seat 10 and the cover 20.

The receiving seat 10 may, advantageously, be made of a metal. The receiving seat 10 includes a bottom plate 12 and a plurality of flanges 124 perpendicularly extending from an edge of the bottom plate 12. The flanges 124 surround a receiving space 14. The bottom plate 12 defines an opening 122. A plurality of stacked portions 126 are formed among the flanges 124 for electronically connecting to the electronic board 220. In this exemplary embodiment, a stacked portion 126 is arranged at each end of the bottom plate 12. A barrel 128 is formed between the two stacked portions 126 at one side of the bottom plate 12. Each flange 124 at an opposite side of the barrel 128 respectively defines a recess 1242. Correspondingly, referring to FIG. 3, a projection 1244 is formed at an opposite side thereof. The flanges 124, the stacked portions 126 and the barrel 128 are integrally formed together by punching.

The cover 20 may be made of a metal. The cover 20 includes a panel 22 for covering the receiving space 14. The configuration of the panel 22 corresponds to a configuration of the bottom plate 12. The panel 22 defines a first hole 2222 and a second hole 2224. A partition wall 2226 is formed between the first hole 2222 and the second hole 2224. Several concave portions 229 are formed on the cover 20 for applying pressure to the SIM card 300. One side of the cover 20 forms two spaced mounting portion 224. A distance between the two mounting portion 224 is substantially equal to a length of the barrel 128. The other side of the cover 20 forms two latching portions 228 and a locking portion 226 between the latching portions 228. Each latching portion 228 is substantially S-shaped for elastically engaging with the projection 1244 of the flanges 124. The locking portion 226 extends upward from the edge of the panel 22. The locking portion 226 defines a fixing hole 2262 for receiving the protrusion 236 of the main body 200. A interlocking portion 2264 extends from an inner edge of the fixing hole 2262.

The pivot shaft 30 is substantially a cylindrical rod, and is used for passing through the barrel 128 and the mounting portions 224 for rotatably connected the cover 20 to the receiving seat 10.

Figure 3:
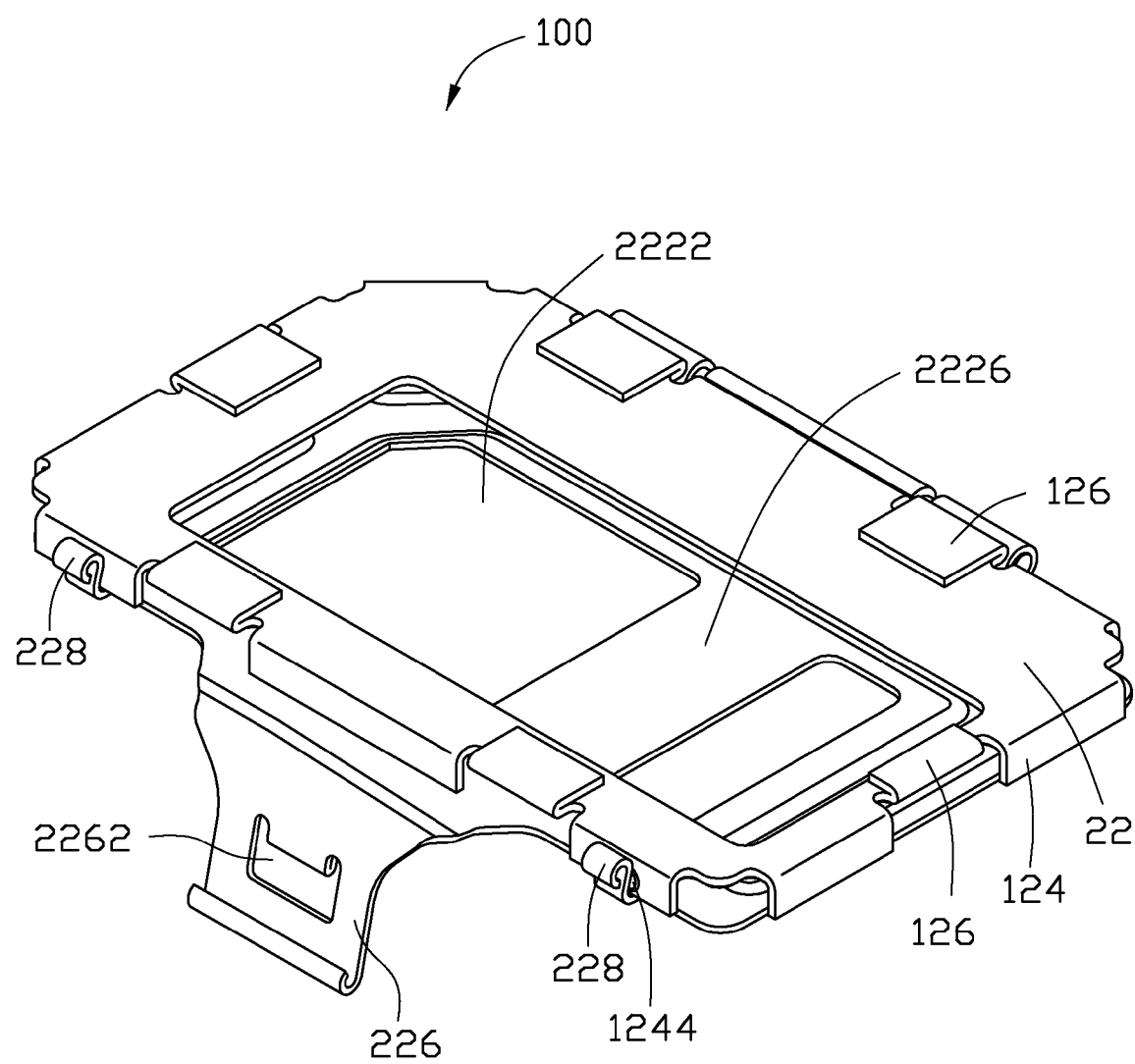
FIG. 3 is an assembled process view of the surface contact card holder.
Figure 4:
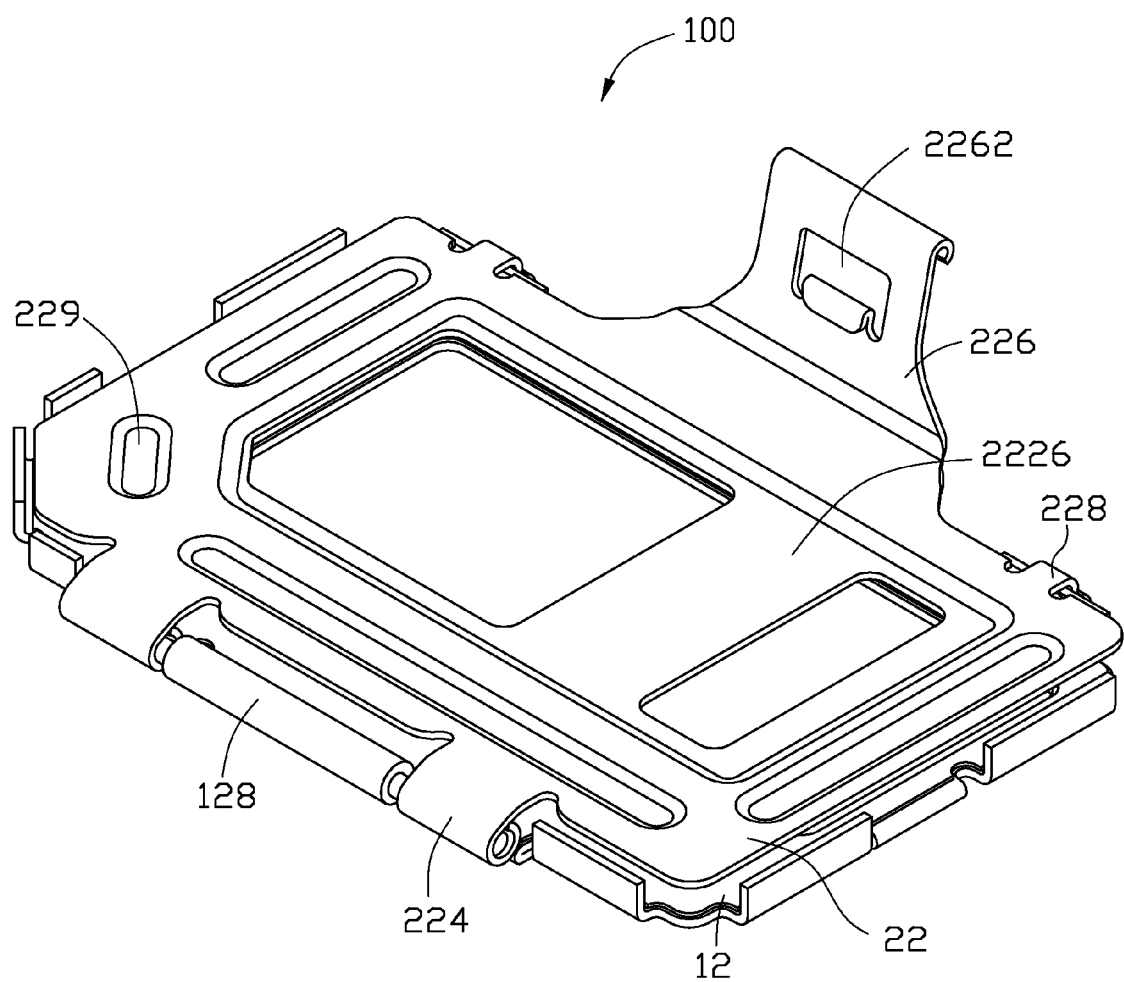
FIG. 4 is similar to FIG. 3, but viewed from another aspect.

Referring to FIGS. 3 and 4, when assembling the cover 20 to the receiving seat 10, the mounting portions 224 are positioned at two sides of the barrel 228. The pivot shaft 30 is inserted through the barrel 128 and the mounting portions 224. The cover 20 rotatably covers the receiving seat 10, and the latching portions 228 respectively interlock with the projections 1244 for latching the cover 20 to the receiving seat 10, thereby completing the assembly of the surface contact card holder 100.

When assembling the surface contact card holder 100 to the main body 200 of the mobile phone, the receiving seat 10 with the cover 20 is positioned on the electronic board 220. The receiving seat 10 is fixed on the electronic board 220 through the stacked portions 126 by welding. The electrical contacts on the electronic board 220 are exposed from the opening 122. The locking portion 226 interlocks with the concave portion 234, and the protrusion 236 is received in the fixing hole 2262. The protrusion 236 further interlocks with the interlocking portion 2264, thereby latching the locking portion 226 to the main body 200.

When assembling of the SIM card 300 to the holder 100, firstly, the user places a finger on the concave portion 234 of the mobile phone 100 and pushes the locking portion 226 away from the concave portion 234 of the main body 200. Accordingly, the fixing hole 2262 separates away from the protrusion 236. Then, the locking portion 226 is pushed so as to force the cover 20 to rotate to open relative to the receiving seat 10 along the shaft 39. After that, the SIM card 300 is put in the receiving space 14. When the SIM card 300 is completely put into the receiving space 14, the cover 20 rotatably covers the receiving seat 10. The latching portions 228 respectively latch the projections 1244 of the flanges 124 so that the SIM card 300 is prevented from sliding out.

The steps of removing the SIM card 300 from the surface contact card holder 100 are the reverse of the put method shown above.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A surface contact card holder comprising:
a receiving seat configured for carrying a surface contact card therein, the receiving seat including a bottom plate and a plurality of flanges perpendicularly extending from an edge of the bottom plate, and the flanges surrounding a receiving space for receiving the surface contact card, a plurality of stacked portions being formed among the flanges for electronically connecting to the main body;
a cover for covering the receiving seat and releasably latching the receiving seat; and
a pivot shaft rotatably connecting the cover to the receiving seat for allowing insertion and removal of the surface contact card.

2. A portable electronic device comprising:
a main body;
a receiving seat being fixed to the main body configured for carrying a surface contact card therein;
a cover forming a locking portion and at least one latching portion, the latching portion releasably latching the cover to the receiving seat, the locking portion releasably locking the cover to the main body; and
a pivot shaft rotatably connecting the cover to the receiving seat for allowing insertion and removal of the surface contact card.

3. A surface contact card holder comprising:
a receiving seat configured for carrying a surface contact card therein, the receiving seat including a plurality of stacked portions for electronically connecting to the main body;
a cover for covering the receiving seat and releasably latching the receiving seat; and
a pivot shaft rotatably connecting the cover to the receiving seat for allowing insertion and removal of the surface contact card;
wherein the receiving seat including a plurality of flanges, the flanges surrounding a receiving space for receiving the surface contact card, the stacked portions being formed among the flanges;
wherein at least one flange defines a recess, a projection is formed at an opposite side thereof, and the cover forms at least one latching portion for latching the projection.

4. The surface contact card holder as claimed in claim 1, wherein at least one flange defines a recess, a projection is formed at an opposite side thereof, and the cover forms at least one latching portion for latching the projection.

5. The surface contact card holder as claimed in claim 1, wherein a barrel is formed at one side of the receiving seat, the cover forms two mounting portions at one side, and the pivot shaft passes through the barrel and the mounting portions.

6. The surface contact card holder as claimed in claim 1, wherein the cover forms a locking portion and at least one latching portion, the latching portion releasably latches the cover to the receiving seat, and the locking portion is configured for releasably locking a main body of a portable electronic device.

7. The portable electronic device as claimed in claim 2, wherein the receiving seat includes a bottom plate and a plurality of flanges perpendicularly extending from an edge of the bottom plate, and the flanges surrounding a receiving space for receiving a surface contact card.

8. The portable electronic device as claimed in claim 2, wherein a barrel is formed at one side of the receiving seat, the cover forms two mounting portions at one side, and the pivot shaft passes through the barrel and the mounting portions.

9. The portable electronic device as claimed in claim 2, wherein the main body forms a protrusion, the locking portion defining a fixing hole for receiving the protrusion of the main body.

10. The surface contact card holder as claimed in claim 9, wherein an interlocking portion extends from an inner edge of the fixing hole.

11. The portable electronic device as claimed in claim 9, wherein the main body forms a concave surface, the protrusion is formed on the concave surface.

12. The portable electronic device as claimed in claim 7, wherein a plurality of stacked portions are formed among the flanges for electronically connecting to the main body.

13. The portable electronic device as claimed in claim 3, wherein the cover forms a locking portion and at least one latching portion, the latching portion releasably latches the cover to the receiving seat, and the locking portion is configured for releasably locking a main body of a portable electronic device.

* * * * *